United States Patent
Wehrs et al.

(10) Patent No.: US 8,290,721 B2
(45) Date of Patent: Oct. 16, 2012

(54) FLOW MEASUREMENT DIAGNOSTICS

(75) Inventors: David L. Wehrs, Eden Prairie, MN (US); Evren Eryurek, Melbourne, FL (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/503,878

(22) Filed: Aug. 14, 2006

(65) Prior Publication Data

US 2006/0277000 A1   Dec. 7, 2006

Related U.S. Application Data

(63) Continuation-in-part of application No. 10/801,073, filed on Mar. 15, 2004, now Pat. No. 7,254,518, which is a continuation-in-part of application No. 09/852,102, filed on May 9, 2001, now Pat. No. 6,907,383, which is a continuation-in-part of application No. 09/257,896, filed on Feb. 25, 1999, now abandoned, which is a continuation-in-part of application No. 08/623,569, filed on Mar. 28, 1996, now Pat. No. 6,017,143, said application No. 09/852,102 is a continuation-in-part of application No. 09/383,828, filed on Aug. 27, 1999, now Pat. No. 6,654,697, which is a continuation-in-part of application No. 09/257,896, filed on Feb. 25, 1999, now abandoned, which is a continuation-in-part of application No. 08/623,569, filed on Mar. 28, 1996, now Pat. No. 6,017,143.

(51) Int. Cl.
*G01F 1/00* (2006.01)
*G06F 19/00* (2011.01)

(52) U.S. Cl. ........... 702/45; 702/179; 702/189; 702/190
(58) Field of Classification Search ............. 702/45–54, 702/179–189
See application file for complete search history.

(56) References Cited

U.S. PATENT DOCUMENTS

| | | | |
|---|---|---|---|
| 3,096,434 A | 7/1963 | King | 235/151 |
| 3,404,264 A | 10/1968 | Kugler | 235/194 |
| 3,468,164 A | 9/1969 | Sutherland | 73/343 |
| 3,590,370 A | 6/1971 | Fleischer | 324/51 |
| 3,618,592 A | 11/1971 | Stewart | 128/2.05 R |

(Continued)

FOREIGN PATENT DOCUMENTS

CA        999950         11/1976
(Continued)

OTHER PUBLICATIONS

"Rosemount Durchflussmessgerate mit Kompaktmessblende" Emerson Process Management, Apr. 2005, Retrieved from Internet URL:http://www.emersonprocess.com/rosemount/document/pds/00813-0105-4810.pdf.

(Continued)

*Primary Examiner* — Phuong Huynh
(74) *Attorney, Agent, or Firm* — Westman, Champlin & Kelly, P.A.

(57) ABSTRACT

A flow meter for measuring flow of a process fluid includes a sensor configured to provide a sensor output signal. The sensor output signal is related to flow of the process fluid. Circuitry in the flow meter is configured to determine a statistical parameter related to sensor output signal. Diagnostic circuitry provides a diagnostic output based upon the determined statistical parameter and the sensor output signal.

16 Claims, 4 Drawing Sheets

U.S. PATENT DOCUMENTS

| | | | |
|---|---|---|---|
| 3,688,190 A | 8/1972 | Blum | 324/61 R |
| 3,691,842 A | 9/1972 | Akeley | 73/398 C |
| 3,701,280 A | 10/1972 | Stroman | 73/194 |
| 3,849,637 A | 11/1974 | Caruso et al. | 235/151 |
| 3,855,858 A | 12/1974 | Cushing | 73/194 EM |
| 3,948,098 A | 4/1976 | Richardson et al. | 73/861.24 |
| 3,952,759 A | 4/1976 | Ottenstein | 137/12 |
| 3,973,184 A | 8/1976 | Raber | 324/51 |
| RE29,383 E | 9/1977 | Gallatin et al. | 137/14 |
| 4,058,975 A | 11/1977 | Gilbert et al. | 60/39.28 |
| 4,083,031 A | 4/1978 | Pharo, Jr. | 367/135 |
| 4,099,413 A | 7/1978 | Ohte et al. | 73/359 |
| 4,102,199 A | 7/1978 | Talpouras | 73/362 |
| 4,122,719 A | 10/1978 | Carlson et al. | 73/342 |
| 4,249,164 A | 2/1981 | Tivy | 340/870.3 |
| 4,250,490 A | 2/1981 | Dahlke | 340/870.37 |
| 4,255,964 A | 3/1981 | Morison | 73/24.01 |
| 4,279,013 A | 7/1981 | Cameron et al. | 340/870.37 |
| 4,337,516 A | 6/1982 | Murphy et al. | 364/551 |
| 4,383,443 A | 5/1983 | Langdon | 73/290 |
| 4,390,321 A | 6/1983 | Langlois et al. | 417/15 |
| 4,399,824 A | 8/1983 | Davidson | 128/736 |
| 4,417,312 A | 11/1983 | Cronin et al. | 364/510 |
| 4,423,634 A | 1/1984 | Audenard et al. | 73/587 |
| 4,446,741 A | 5/1984 | Sirokorad et al. | 73/654 |
| 4,459,858 A | 7/1984 | Marsh | 73/861.12 |
| 4,463,612 A | 8/1984 | Thompson | 73/861.22 |
| 4,517,468 A | 5/1985 | Kemper et al. | 290/52 |
| 4,528,869 A | 7/1985 | Kubo et al. | 74/695 |
| 4,530,234 A | 7/1985 | Cullick et al. | 73/53 |
| 4,536,753 A | 8/1985 | Parker | 340/653 |
| 4,540,468 A | 9/1985 | Genco et al. | 162/49 |
| 4,571,689 A | 2/1986 | Hildebrand et al. | 364/481 |
| 4,630,265 A | 12/1986 | Sexton | 370/85 |
| 4,635,214 A | 1/1987 | Kasai et al. | 364/551 |
| 4,642,782 A | 2/1987 | Kemper et al. | 364/550 |
| 4,644,479 A | 2/1987 | Kemper et al. | 364/550 |
| 4,649,515 A | 3/1987 | Thompson et al. | 364/900 |
| 4,668,473 A | 5/1987 | Agarwal | 422/62 |
| 4,686,638 A | 8/1987 | Furuse | 364/558 |
| 4,696,191 A | 9/1987 | Claytor et al. | 73/600 |
| 4,705,212 A | 11/1987 | Miller et al. | 236/54 |
| 4,707,796 A | 11/1987 | Calabro et al. | 364/552 |
| 4,720,806 A | 1/1988 | Schippers et al. | 364/551 |
| 4,736,367 A | 4/1988 | Wroblewski et al. | 370/85 |
| 4,736,763 A | 4/1988 | Britton et al. | 137/10 |
| 4,758,308 A | 7/1988 | Carr | 162/263 |
| 4,777,585 A | 10/1988 | Kokawa et al. | 364/164 |
| 4,807,151 A | 2/1989 | Citron | 364/510 |
| 4,818,994 A | 4/1989 | Orth et al. | 340/501 |
| 4,831,564 A | 5/1989 | Suga | 364/551.01 |
| 4,833,922 A | 5/1989 | Frick et al. | 73/756 |
| 4,841,286 A | 6/1989 | Kummer | 340/653 |
| 4,853,693 A | 8/1989 | Eaton-Williams | 340/588 |
| 4,866,628 A | 9/1989 | Natarajan | 700/102 |
| 4,873,655 A | 10/1989 | Kondraske | 364/553 |
| 4,907,167 A | 3/1990 | Skeirik | 364/500 |
| 4,924,418 A | 5/1990 | Backman et al. | 364/550 |
| 4,926,364 A | 5/1990 | Brotherton | 364/581 |
| 4,934,196 A | 6/1990 | Romano | 73/861.38 |
| 4,939,753 A | 7/1990 | Olson | 375/107 |
| 4,964,125 A | 10/1990 | Kim | 371/15.1 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,019,760 A | 5/1991 | Chu et al. | 318/490 |
| 5,025,344 A | 6/1991 | Maly et al. | 361/88 |
| 5,043,862 A | 8/1991 | Takahashi et al. | 364/162 |
| 5,047,990 A | 9/1991 | Gafos et al. | 367/6 |
| 5,053,815 A | 10/1991 | Wendell | 355/208 |
| 5,057,774 A | 10/1991 | Verhelst et al. | 324/537 |
| 5,067,099 A | 11/1991 | McCown et al. | 364/550 |
| 5,081,598 A | 1/1992 | Bellows et al. | 364/550 |
| 5,089,979 A | 2/1992 | McEachern et al. | 364/571.04 |
| 5,089,984 A | 2/1992 | Struger et al. | 395/650 |
| 5,094,109 A | 3/1992 | Dean et al. | 73/718 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/550 |
| 5,130,936 A | 7/1992 | Sheppard et al. | 364/551.01 |
| 5,134,574 A | 7/1992 | Beaverstock et al. | 364/551.01 |
| 5,137,370 A | 8/1992 | McCullock et al. | 374/173 |
| 5,142,612 A | 8/1992 | Skeirik | 395/11 |
| 5,143,452 A | 9/1992 | Maxedon et al. | 374/170 |
| 5,148,378 A | 9/1992 | Shibayama et al. | 364/551.07 |
| 5,150,289 A | 9/1992 | Badavas | 364/154 |
| 5,167,009 A | 11/1992 | Skeirik | 395/27 |
| 5,175,678 A | 12/1992 | Frerichs et al. | 364/148 |
| 5,189,624 A | 2/1993 | Barlow et al. | 700/169 |
| 5,193,143 A | 3/1993 | Kaemmerer et al. | 395/51 |
| 5,197,114 A | 3/1993 | Skeirik | 395/22 |
| 5,197,328 A | 3/1993 | Fitzgerald | 73/168 |
| 5,212,765 A | 5/1993 | Skeirik | 395/11 |
| 5,214,582 A | 5/1993 | Gray | 364/424.03 |
| 5,216,226 A | 6/1993 | Miyoshi | 219/497 |
| 5,216,612 A | 6/1993 | Cornett et al. | 700/96 |
| 5,224,203 A | 6/1993 | Skeirik | 395/22 |
| 5,228,780 A | 7/1993 | Shepard et al. | 374/175 |
| 5,235,527 A | 8/1993 | Ogawa et al. | 364/571.05 |
| 5,265,031 A | 11/1993 | Malczewski | 364/497 |
| 5,265,222 A | 11/1993 | Nishiya et al. | 395/3 |
| 5,267,241 A | 11/1993 | Kowal | 714/706 |
| 5,269,311 A | 12/1993 | Kirchner et al. | 128/672 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,317,520 A | 5/1994 | Castle | 364/482 |
| 5,327,357 A | 7/1994 | Feinstein et al. | 364/502 |
| 5,333,240 A | 7/1994 | Matsumoto et al. | 706/20 |
| 5,340,271 A | 8/1994 | Freeman et al. | 415/1 |
| 5,347,843 A | 9/1994 | Orr et al. | 73/3 |
| 5,349,541 A | 9/1994 | Alexandro, Jr. et al. | 364/578 |
| 5,351,199 A | 9/1994 | Ticcioni et al. | 700/282 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,365,787 A | 11/1994 | Hernandez et al. | 73/660 |
| 5,367,612 A | 11/1994 | Bozich et al. | 395/22 |
| 5,369,674 A | 11/1994 | Yokose et al. | 376/245 |
| 5,384,699 A | 1/1995 | Levy et al. | 364/413.13 |
| 5,386,373 A | 1/1995 | Keeler et al. | 364/577 |
| 5,388,465 A | 2/1995 | Okaniwa et al. | 73/861.17 |
| 5,392,293 A | 2/1995 | Hsue | 324/765 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Mathur et al. | 364/163 |
| 5,408,586 A | 4/1995 | Skeirik | 395/23 |
| 5,410,495 A | 4/1995 | Ramamurthi | 364/511.05 |
| 5,414,645 A | 5/1995 | Hirano | 364/551.01 |
| 5,419,197 A | 5/1995 | Ogi et al. | 73/659 |
| 5,430,642 A | 7/1995 | Nakajima et al. | 364/148 |
| 5,434,774 A | 7/1995 | Seberger | 364/172 |
| 5,436,705 A | 7/1995 | Raj | 355/246 |
| 5,440,478 A | 8/1995 | Fisher et al. | 364/188 |
| 5,442,639 A | 8/1995 | Crowder et al. | 371/20.1 |
| 5,444,820 A | 8/1995 | Tzes et al. | 706/21 |
| 5,467,355 A | 11/1995 | Umeda et al. | 364/571.04 |
| 5,469,070 A | 11/1995 | Koluvek | 324/713 |
| 5,469,156 A | 11/1995 | Kogure | 340/870.38 |
| 5,469,735 A | 11/1995 | Watanabe | 73/118.1 |
| 5,469,749 A | 11/1995 | Shimada et al. | 73/861.47 |
| 5,481,199 A | 1/1996 | Anderson et al. | 324/158 |
| 5,481,200 A | 1/1996 | Voegele et al. | 324/718 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 364/152 |
| 5,488,697 A | 1/1996 | Kaemmerer et al. | 395/51 |
| 5,489,831 A | 2/1996 | Harris | 318/701 |

| Patent No. | Date | Inventor | Class |
|---|---|---|---|
| 5,495,769 A | 3/1996 | Broden et al. | 73/718 |
| 5,510,779 A | 4/1996 | Maltby et al. | 340/870.3 |
| 5,511,004 A | 4/1996 | Dubost et al. | 364/551.01 |
| 5,521,840 A | 5/1996 | Bednar | 364/508 |
| 5,526,293 A | 6/1996 | Mozumder et al. | 364/578 |
| 5,539,638 A | 7/1996 | Keeler et al. | 364/424.03 |
| 5,548,528 A | 8/1996 | Keeler et al. | 364/497 |
| 5,549,137 A | 8/1996 | Lenz et al. | 137/486 |
| 5,551,306 A * | 9/1996 | Scarpa | 73/861.16 |
| 5,555,190 A | 9/1996 | Derby et al. | 364/510 |
| 5,560,246 A | 10/1996 | Bottinger et al. | 73/861.15 |
| 5,561,599 A | 10/1996 | Lu | 364/164 |
| 5,570,034 A | 10/1996 | Needham et al. | 324/763 |
| 5,570,300 A | 10/1996 | Henry et al. | 364/551.01 |
| 5,572,420 A | 11/1996 | Lu | 364/153 |
| 5,572,438 A | 11/1996 | Ehlers et al. | 700/295 |
| 5,573,032 A | 11/1996 | Lenz et al. | 137/486 |
| 5,578,763 A | 11/1996 | Spencer et al. | 73/861.08 |
| 5,591,922 A | 1/1997 | Segeral et al. | 73/861.04 |
| 5,598,521 A | 1/1997 | Kilgore et al. | 395/326 |
| 5,600,148 A | 2/1997 | Cole et al. | 250/495.1 |
| 5,600,791 A | 2/1997 | Carlson et al. | 714/47.3 |
| 5,608,650 A | 3/1997 | McClendon et al. | 364/510 |
| 5,623,605 A | 4/1997 | Keshav et al. | 395/200.17 |
| 5,629,870 A | 5/1997 | Farag et al. | 364/551.01 |
| 5,633,809 A | 5/1997 | Wissenbach et al. | 364/510 |
| 5,637,802 A | 6/1997 | Frick et al. | 73/724 |
| 5,640,491 A | 6/1997 | Bhat et al. | 395/22 |
| 5,644,240 A | 7/1997 | Brugger | 324/439 |
| 5,650,943 A | 7/1997 | Powell et al. | 702/51 |
| 5,654,869 A | 8/1997 | Ohi et al. | 361/540 |
| 5,661,668 A | 8/1997 | Yemini et al. | 364/550 |
| 5,665,899 A | 9/1997 | Willcox | 73/1.63 |
| 5,668,322 A | 9/1997 | Broden | 73/755 |
| 5,669,713 A | 9/1997 | Schwartz et al. | 374/1 |
| 5,671,335 A | 9/1997 | Davis et al. | 395/23 |
| 5,672,247 A | 9/1997 | Pangalos et al. | 162/65 |
| 5,675,504 A | 10/1997 | Serodes et al. | 364/496 |
| 5,675,724 A | 10/1997 | Beal et al. | 395/182.04 |
| 5,680,109 A | 10/1997 | Lowe et al. | 340/608 |
| 5,682,317 A | 10/1997 | Keeler et al. | 364/431.03 |
| 5,682,476 A | 10/1997 | Tapperson et al. | 370/225 |
| 5,700,090 A | 12/1997 | Eryurek | 374/210 |
| 5,703,575 A | 12/1997 | Kirkpatrick | 340/870.17 |
| 5,704,011 A | 12/1997 | Hansen et al. | 395/22 |
| 5,705,754 A | 1/1998 | Keita et al. | 73/861.357 |
| 5,705,978 A | 1/1998 | Frick et al. | 340/511 |
| 5,708,211 A | 1/1998 | Jepson et al. | 73/861.04 |
| 5,708,585 A | 1/1998 | Kushion | 364/431.061 |
| 5,710,370 A | 1/1998 | Shanahan et al. | 73/1.35 |
| 5,710,708 A | 1/1998 | Wiegand | 364/470.1 |
| 5,713,668 A | 2/1998 | Lunghofer et al. | 374/179 |
| 5,719,378 A | 2/1998 | Jackson, Jr. et al. | 219/497 |
| 5,731,522 A | 3/1998 | Sittler | 73/708 |
| 5,736,649 A | 4/1998 | Kawasaki et al. | 73/861.23 |
| 5,741,074 A | 4/1998 | Wang et al. | 374/185 |
| 5,742,845 A | 4/1998 | Wagner | 395/831 |
| 5,746,511 A | 5/1998 | Eryurek et al. | 374/2 |
| 5,747,701 A | 5/1998 | Marsh et al. | 73/861.23 |
| 5,748,883 A | 5/1998 | Carlson et al. | 714/47.3 |
| 5,752,008 A | 5/1998 | Bowling | 395/500 |
| 5,754,451 A | 5/1998 | Williams | 702/185 |
| 5,764,539 A | 6/1998 | Rani | 364/557 |
| 5,764,891 A | 6/1998 | Warrior | 710/72 |
| 5,781,024 A | 7/1998 | Blomberg et al. | 324/763 |
| 5,781,878 A | 7/1998 | Mizoguchi et al. | 701/109 |
| 5,790,413 A | 8/1998 | Bartusiak et al. | 364/485 |
| 5,796,006 A | 8/1998 | Bellet et al. | 73/661 |
| 5,801,689 A | 9/1998 | Huntsman | 345/329 |
| 5,805,442 A | 9/1998 | Crater et al. | 364/138 |
| 5,817,950 A | 10/1998 | Wiklund et al. | 73/861.66 |
| 5,825,664 A | 10/1998 | Warrior et al. | 700/7 |
| 5,828,567 A | 10/1998 | Eryurek et al. | 700/79 |
| 5,829,876 A | 11/1998 | Schwartz et al. | 374/1 |
| 5,848,383 A | 12/1998 | Yuuns | 702/102 |
| 5,854,993 A | 12/1998 | Crichnik | 702/54 |
| 5,854,994 A | 12/1998 | Canada et al. | 702/56 |
| 5,859,964 A | 1/1999 | Wang et al. | 395/185.01 |
| 5,869,772 A | 2/1999 | Storer | 73/861.24 |
| 5,876,122 A | 3/1999 | Eryurek | 374/183 |
| 5,880,376 A | 3/1999 | Sai et al. | 73/861.08 |
| 5,887,978 A | 3/1999 | Lunghofer et al. | 374/179 |
| 5,908,990 A | 6/1999 | Cummings | 73/861.22 |
| 5,920,016 A | 7/1999 | Broden | 73/756 |
| 5,923,557 A | 7/1999 | Eidson | 364/471.03 |
| 5,924,086 A | 7/1999 | Mathur et al. | 706/25 |
| 5,926,778 A | 7/1999 | Pöppel | 702/130 |
| 5,934,371 A | 8/1999 | Bussear et al. | 166/53 |
| 5,936,514 A | 8/1999 | Anderson et al. | 340/310.01 |
| 5,940,013 A | 8/1999 | Vladimir et al. | 340/945 |
| 5,940,290 A | 8/1999 | Dixon | 364/138 |
| 5,956,663 A | 9/1999 | Eryurek et al. | 702/183 |
| 5,970,430 A | 10/1999 | Burns et al. | 702/122 |
| 5,995,910 A | 11/1999 | Discenzo | 702/56 |
| 6,002,952 A | 12/1999 | Diab et al. | 600/310 |
| 6,006,338 A | 12/1999 | Longsdorf et al. | 713/340 |
| 6,014,612 A | 1/2000 | Larson et al. | 702/183 |
| 6,014,902 A | 1/2000 | Lewis et al. | 73/861.12 |
| 6,016,523 A | 1/2000 | Zimmerman et al. | 710/63 |
| 6,016,706 A | 1/2000 | Yamamoto et al. | 9/6 |
| 6,017,143 A | 1/2000 | Eryurek et al. | 700/51 |
| 6,023,399 A | 2/2000 | Kogure | 361/23 |
| 6,026,352 A | 2/2000 | Burns et al. | 702/182 |
| 6,038,579 A | 3/2000 | Sekine | 708/400 |
| 6,045,260 A | 4/2000 | Schwartz et al. | 374/183 |
| 6,046,642 A | 4/2000 | Brayton et al. | 330/296 |
| 6,047,220 A | 4/2000 | Eryurek et al. | 700/28 |
| 6,047,222 A | 4/2000 | Burns et al. | 700/79 |
| 6,052,655 A | 4/2000 | Kobayashi et al. | 702/184 |
| 6,059,254 A | 5/2000 | Sundet et al. | 248/678 |
| 6,061,603 A | 5/2000 | Papadopoulos et al. | 700/83 |
| 6,072,150 A | 6/2000 | Sheffer | 219/121.83 |
| 6,094,600 A | 7/2000 | Sharpe, Jr. et al. | 700/19 |
| 6,104,875 A | 8/2000 | Gallagher et al. | 717/168 |
| 6,112,131 A | 8/2000 | Ghorashi et al. | 700/142 |
| 6,119,047 A | 9/2000 | Eryurek et al. | 700/28 |
| 6,119,529 A | 9/2000 | Di Marco et al. | 73/861.68 |
| 6,139,180 A | 10/2000 | Usher et al. | 374/1 |
| 6,151,560 A | 11/2000 | Jones | 702/58 |
| 6,179,964 B1 | 1/2001 | Begemann et al. | 162/198 |
| 6,182,501 B1 | 2/2001 | Furuse et al. | 73/49.2 |
| 6,192,281 B1 | 2/2001 | Brown et al. | 700/2 |
| 6,195,591 B1 | 2/2001 | Nixon et al. | 700/2 |
| 6,199,018 B1 | 3/2001 | Quist et al. | 702/34 |
| 6,209,048 B1 | 3/2001 | Wolff | 710/62 |
| 6,236,948 B1 | 5/2001 | Eck et al. | 702/45 |
| 6,237,424 B1 | 5/2001 | Salmasi et al. | 73/861.17 |
| 6,260,004 B1 | 7/2001 | Hays et al. | 702/183 |
| 6,263,487 B1 | 7/2001 | Stripf et al. | 717/1 |
| 6,272,438 B1 | 8/2001 | Cunningham et al. | 702/56 |
| 6,289,735 B1 | 9/2001 | Dister et al. | 73/579 |
| 6,298,377 B1 | 10/2001 | Hartikainen et al. | 709/223 |
| 6,298,454 B1 | 10/2001 | Schleiss et al. | 714/37 |
| 6,307,483 B1 | 10/2001 | Westfield et al. | 340/870.11 |
| 6,311,136 B1 | 10/2001 | Henry et al. | 702/45 |
| 6,317,701 B1 | 11/2001 | Pyotsia et al. | 702/188 |
| 6,327,914 B1 | 12/2001 | Dutton | 73/861.356 |
| 6,330,005 B1 | 12/2001 | Tonelli et al. | 715/735 |
| 6,347,252 B1 | 2/2002 | Behr et al. | 700/2 |
| 6,356,191 B1 | 3/2002 | Kirkpatrick et al. | 340/501 |
| 6,360,277 B1 | 3/2002 | Ruckley et al. | 9/250 |
| 6,370,448 B1 | 4/2002 | Eryurek et al. | 700/282 |
| 6,377,859 B1 | 4/2002 | Brown et al. | 700/79 |
| 6,378,364 B1 | 4/2002 | Pelletier et al. | 73/152.47 |
| 6,396,426 B1 | 5/2002 | Balard et al. | 341/120 |
| 6,397,114 B1 | 5/2002 | Eryurek et al. | 700/51 |
| 6,405,099 B1 | 6/2002 | Nagai et al. | 700/159 |
| 6,425,038 B1 | 7/2002 | Sprecher | 710/269 |
| 6,434,504 B1 | 8/2002 | Eryurek et al. | 702/130 |
| 6,447,459 B1 | 9/2002 | Larom | 600/538 |
| 6,449,574 B1 | 9/2002 | Eryurek et al. | 702/99 |
| 6,473,656 B1 | 10/2002 | Langels et al. | 700/17 |
| 6,473,710 B1 | 10/2002 | Eryurek | 702/133 |
| 6,480,793 B1 | 11/2002 | Martin | 702/45 |
| 6,492,921 B1 | 12/2002 | Kunitani et al. | 341/118 |
| 6,493,689 B2 | 12/2002 | Kotoulas et al. | 706/23 |
| 6,496,814 B1 | 12/2002 | Busche | 706/21 |
| 6,497,222 B2 | 12/2002 | Bolz et al. | 123/476 |

| | | | |
|---|---|---|---|
| 6,505,517 B1 | 1/2003 | Eryurek et al. | 73/861.08 |
| 6,519,546 B1 | 2/2003 | Eryurek et al. | 702/130 |
| 6,530,259 B1 | 3/2003 | Kelly et al. | 73/23.2 |
| 6,532,392 B1 | 3/2003 | Eryurek et al. | 700/54 |
| 6,539,267 B1 | 3/2003 | Eryurek et al. | 700/51 |
| 6,546,814 B1 | 4/2003 | Choe et al. | 73/862.08 |
| 6,556,145 B1 | 4/2003 | Kirkpatrick et al. | 340/870.17 |
| 6,561,038 B2 | 5/2003 | Gravel et al. | 73/729.2 |
| 6,564,268 B1 | 5/2003 | Davis et al. | 710/11 |
| 6,567,006 B1 | 5/2003 | Lander et al. | 340/605 |
| 6,594,603 B1 | 7/2003 | Eryurek et al. | 702/104 |
| 6,597,997 B2 | 7/2003 | Tingley | 702/34 |
| 6,601,005 B1 | 7/2003 | Eryurek et al. | 702/104 |
| 6,611,775 B1 | 8/2003 | Coursolle et al. | 702/65 |
| 6,615,149 B1 | 9/2003 | Wehrs | 702/76 |
| 6,633,782 B1 | 10/2003 | Schleiss et al. | 700/26 |
| 6,637,267 B2 | 10/2003 | Fiebelkorn et al. | 73/587 |
| 6,654,697 B1 | 11/2003 | Eryurek et al. | 702/47 |
| 6,662,120 B2 | 12/2003 | Drahm et al. | 73/861.355 |
| 6,701,274 B1 | 3/2004 | Eryurek et al. | 702/140 |
| 6,722,185 B2 | 4/2004 | Lawson et al. | 73/40 |
| 6,727,812 B2 | 4/2004 | Sauler et al. | 340/511 |
| 6,735,549 B2 | 5/2004 | Ridolfo | 702/181 |
| 6,738,388 B1 | 5/2004 | Stevenson et al. | 370/465 |
| 6,751,560 B1 | 6/2004 | Tingley et al. | 702/104 |
| 6,754,601 B1 | 6/2004 | Eryurek et al. | 702/104 |
| 6,758,168 B2 | 7/2004 | Koskinen et al. | 122/7 |
| 6,785,592 B1 | 8/2004 | Smith et al. | 700/291 |
| 6,813,588 B1 | 11/2004 | Daugert et al. | 702/183 |
| 6,859,755 B2 | 2/2005 | Eryurek et al. | 702/183 |
| 6,892,317 B1 | 5/2005 | Sampath et al. | 714/4.3 |
| 6,904,476 B2 | 6/2005 | Hedtke | 710/72 |
| 6,907,383 B2 | 6/2005 | Eryurek et al. | 702/183 |
| 6,915,364 B1 | 7/2005 | Christensen et al. | 710/104 |
| 6,970,003 B2 | 11/2005 | Rome et al. | 324/718 |
| 6,976,503 B2 | 12/2005 | Ens et al. | 137/552 |
| 7,013,185 B2 | 3/2006 | Simon | 700/19 |
| 7,018,800 B2 | 3/2006 | Huisenga et al. | 435/6 |
| 7,036,381 B2 | 5/2006 | Broden et al. | 73/708 |
| 7,040,179 B2 | 5/2006 | Drahm et al. | 73/861.356 |
| 7,058,542 B2 | 6/2006 | Hauhia et al. | 702/183 |
| 7,085,610 B2 | 8/2006 | Eryurek et al. | 700/29 |
| 7,089,086 B2 | 8/2006 | Schoonover | 700/275 |
| 7,099,852 B2 | 8/2006 | Unsworth et al. | 706/23 |
| 7,109,883 B2 | 9/2006 | Trimble et al. | 340/870.16 |
| 7,114,516 B2 | 10/2006 | Ito | 137/487.5 |
| 7,143,007 B2 | 11/2006 | Long et al. | 702/184 |
| 7,171,281 B2 | 1/2007 | Weber et al. | 700/96 |
| 7,206,646 B2 | 4/2007 | Nixon et al. | 700/83 |
| 7,254,518 B2 | 8/2007 | Eryurek et al. | 702/183 |
| 7,258,021 B2 | 8/2007 | Broden | 73/756 |
| 7,262,693 B2 | 8/2007 | Karschnia et al. | 340/508 |
| 7,435,581 B2 | 10/2008 | West | 435/289.1 |
| 7,502,744 B2 | 3/2009 | Garrow et al. | 705/1.1 |
| 2002/0013629 A1 | 1/2002 | Nixon et al. | |
| 2002/0029808 A1 | 3/2002 | Friend et al. | 137/551 |
| 2002/0032544 A1 | 3/2002 | Reid et al. | 702/104 |
| 2002/0055790 A1 | 5/2002 | Havekost | 700/80 |
| 2002/0077711 A1 | 6/2002 | Nixon | 700/19 |
| 2002/0077782 A1 | 6/2002 | Fruehling et al. | 702/185 |
| 2002/0108436 A1 | 8/2002 | Albuaijan | 73/168 |
| 2002/0121910 A1 | 9/2002 | Rome et al. | 324/718 |
| 2002/0130846 A1 | 9/2002 | Nixon et al. | 345/169 |
| 2002/0145515 A1 | 10/2002 | Snowbarger et al. | 340/514 |
| 2002/0145568 A1 | 10/2002 | Winter | 343/701 |
| 2002/0148644 A1 | 10/2002 | Schultz et al. | 175/39 |
| 2002/0163427 A1 | 11/2002 | Eryurek et al. | 340/630 |
| 2002/0194547 A1 | 12/2002 | Christensen et al. | 714/43 |
| 2003/0014536 A1 | 1/2003 | Christensen et al. | 709/238 |
| 2003/0033040 A1 | 2/2003 | Billings | 700/97 |
| 2003/0045962 A1 | 3/2003 | Eryurek et al. | 700/128 |
| 2003/0083953 A1 | 5/2003 | Starkey | 705/26 |
| 2003/0158803 A1 | 8/2003 | Darken et al. | 705/36 |
| 2004/0078167 A1 | 4/2004 | Tan et al. | 702/181 |
| 2004/0093174 A1 | 5/2004 | Lander | 702/56 |
| 2004/0128034 A1* | 7/2004 | Lenker et al. | 700/282 |
| 2004/0167750 A1 | 8/2004 | Pagnano et al. | 702/189 |
| 2004/0186927 A1 | 9/2004 | Eryurek et al. | 710/12 |
| 2004/0199361 A1 | 10/2004 | Lu et al. | 702/183 |
| 2004/0249583 A1* | 12/2004 | Eryurek et al. | 702/47 |
| 2005/0011278 A1 | 1/2005 | Brown et al. | 73/861.18 |
| 2005/0055137 A1 | 3/2005 | Andren et al. | 700/291 |
| 2005/0072239 A1 | 4/2005 | Longsdorf et al. | 73/649 |
| 2005/0149570 A1 | 7/2005 | Sasaki et al. | 707/104.1 |
| 2005/0168343 A1 | 8/2005 | Longsdorf et al. | 340/664 |
| 2005/0284237 A1 | 12/2005 | Henry et al. | 73/861.356 |
| 2006/0075009 A1 | 4/2006 | Lenz et al. | 708/160 |
| 2006/0087402 A1 | 4/2006 | Manning et al. | 340/3.1 |
| 2006/0127183 A1 | 6/2006 | Bishop | 405/37 |
| 2006/0206288 A1 | 9/2006 | Brahmajosyula et al. | 702/183 |
| 2006/0229931 A1 | 10/2006 | Fligler et al. | 705/10 |
| 2006/0277000 A1 | 12/2006 | Wehrs | 702/183 |
| 2007/0010968 A1 | 1/2007 | Longsdorf et al. | 702/183 |
| 2007/0168057 A1 | 7/2007 | Blevins et al. | 700/53 |
| 2007/0266020 A1 | 11/2007 | Case et al. | 707/5 |
| 2010/0138066 A1 | 6/2010 | Kong | 700/295 |
| 2010/0211443 A1 | 8/2010 | Carrel et al. | 705/14.11 |

FOREIGN PATENT DOCUMENTS

| | | |
|---|---|---|
| CN | 1185841 | 6/1998 |
| CN | 1346435 A | 4/2002 |
| DE | 32 13 866 A1 | 10/1983 |
| DE | 35 03 597 | 7/1986 |
| DE | 35 40 204 C1 | 9/1986 |
| DE | 40 08 560 A1 | 9/1990 |
| DE | 43 43 747 | 6/1994 |
| DE | 44 33 593 A1 | 6/1995 |
| DE | 195 02 499 A1 | 8/1996 |
| DE | 296 00 609 U1 | 3/1997 |
| DE | 197 04 694 A1 | 8/1997 |
| DE | 19930660 A1 | 7/1999 |
| DE | 199 05 071 | 8/2000 |
| DE | 19905071 A1 | 8/2000 |
| DE | 299 17 651 U1 | 12/2000 |
| DE | 19947129 | 4/2001 |
| DE | 100 36 971 A1 | 2/2002 |
| DE | 102 23 725 A1 | 4/2003 |
| EP | 0 122 622 A1 | 10/1984 |
| EP | 0 413 814 A1 | 2/1991 |
| EP | 0 487 419 A2 | 5/1992 |
| EP | 0 512 794 A2 | 11/1992 |
| EP | 0 594 227 A1 | 4/1994 |
| EP | 0 624 847 A1 | 11/1994 |
| EP | 0 644 470 A2 | 3/1995 |
| EP | 0 697 586 A2 | 2/1996 |
| EP | 0 749 057 A1 | 12/1996 |
| EP | 0 825 506 A2 | 7/1997 |
| EP | 0 827 096 A2 | 9/1997 |
| EP | 0 838 768 A2 | 9/1997 |
| EP | 1 022 626 A2 | 10/1997 |
| EP | 0 807 804 A2 | 11/1997 |
| EP | 0 827 096 | 3/1998 |
| EP | 1 058 093 A1 | 5/1999 |
| EP | 0 335 957 B1 | 11/1999 |
| EP | 1 022 626 A2 | 7/2000 |
| FR | 2 302 514 | 9/1976 |
| FR | 2 334 827 | 7/1977 |
| GB | 928704 | 6/1963 |
| GB | 1 534 280 | 11/1978 |
| GB | 1 534 288 | 11/1978 |
| GB | 2 221 042 A | 1/1990 |
| GB | 2 310 346 A | 8/1997 |
| GB | 2 317 969 | 4/1998 |
| GB | 2 342 453 A | 4/2000 |
| GB | 2 347 232 A | 8/2000 |
| GB | 2 441 476 A | 8/2005 |
| JP | 56031573 | 3/1981 |
| JP | 57196619 | 2/1982 |
| JP | 58-129316 | 8/1983 |
| JP | 59-116811 | 7/1984 |
| JP | 59-163520 | 9/1984 |
| JP | 59176643 | 10/1984 |
| JP | 59-211196 | 11/1984 |
| JP | 59-211896 | 11/1984 |
| JP | 60-000507 | 1/1985 |
| JP | 60-76619 | 5/1985 |
| JP | 60-131495 | 7/1985 |
| JP | 60-174915 | 9/1985 |

| | | |
|---|---|---|
| JP | 62-30915 | 2/1987 |
| JP | 62-080535 | 4/1987 |
| JP | 62-50901 | 9/1987 |
| JP | 63-169532 | 7/1988 |
| JP | 64-01914 | 1/1989 |
| JP | 64-72699 | 3/1989 |
| JP | 11-87430 | 7/1989 |
| JP | 2-05105 | 1/1990 |
| JP | 3-118424 | 5/1991 |
| JP | 3-229124 | 10/1991 |
| JP | 4-70906 | 3/1992 |
| JP | 5-122768 | 5/1993 |
| JP | 5-164781 A | 6/1993 |
| JP | 6-95882 | 4/1994 |
| JP | 06242192 | 9/1994 |
| JP | 06-248224 | 10/1994 |
| JP | 7-063586 | 3/1995 |
| JP | 07234988 | 9/1995 |
| JP | 7-294356 | 11/1995 |
| JP | 07294356 A2 | 11/1995 |
| JP | 8-054923 | 2/1996 |
| JP | 8-102241 | 4/1996 |
| JP | 08-114638 | 5/1996 |
| JP | 8-136386 | 5/1996 |
| JP | Hei8/1996-136386 | 5/1996 |
| JP | 8-166309 | 6/1996 |
| JP | Hei8/1996-166309 | 6/1996 |
| JP | 8-247076 | 9/1996 |
| JP | 8-313466 | 11/1996 |
| JP | 2712625 | 10/1997 |
| JP | 2712701 | 10/1997 |
| JP | 2753592 | 3/1998 |
| JP | 07225530 | 5/1998 |
| JP | 10-232170 | 9/1998 |
| JP | 11-083575 | 3/1999 |
| JP | 11-505922 | 5/1999 |
| JP | 3129121 | 11/2000 |
| JP | 3139597 | 12/2000 |
| JP | 3147275 | 12/2000 |
| JP | 2002-538420 U | 11/2002 |
| JP | 2003-503784 A | 1/2003 |
| JP | 2007-507712 A | 3/2007 |
| JP | 2008-513879 | 5/2008 |
| RU | 2190267 C2 | 9/2002 |
| WO | WO 94/25933 | 11/1994 |
| WO | WO 95/23361 | 8/1995 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/14855 | 4/1998 |
| WO | WO 98/20469 | 5/1998 |
| WO | WO 98/39718 | 9/1998 |
| WO | WO 99/10712 | 3/1999 |
| WO | WO 99/19782 | 4/1999 |
| WO | WO 00/41050 | 7/2000 |
| WO | WO 00/50851 | 8/2000 |
| WO | WO 00/55700 | 9/2000 |
| WO | WO 00/70531 | 11/2000 |
| WO | WO 01/01213 A1 | 1/2001 |
| WO | WO 01/19440 A1 | 3/2001 |
| WO | WO 01/59346 | 8/2001 |
| WO | WO 01/77766 | 10/2001 |
| WO | WO 01/90704 A2 | 11/2001 |
| WO | WO 02/27418 | 4/2002 |
| WO | WO 03/048713 A1 | 6/2003 |
| WO | WO 03/081002 A1 | 10/2003 |
| WO | WO 2007/100280 A1 | 9/2007 |

OTHER PUBLICATIONS

Notification of Transmittal of the International Search Report and the Written Opinion of the International Searching Authority, or the Declaration for PCT/US2007/001405.
"Gas Pipeline Monitoring by Acoustic Method", by H. Koyama et al., *Transactions of the Society of Instrument and Control Engineers*, vol. 29, No. 3, pp. 295-301, 1993.
"Experience with the Acoustic Ranger—A sound Method for Tube Inspection", by E.S. Morgan, *Materials Evaluation*, Columbus, OH, vol. 39, pp. 926-930, Sep. 1981.
"On-Line Detection of Blockages in Pressure Sensing Systems", by D.W. Mitchell et al., *ASME/JSME Nuclear Engineering Conference*, vol. 2, pp. 775-781, Mar. 1993.
"Detecting Blockage in Process Connections of Differential Pressure Transmitters", by E. Taya et al., *SICE 95-Proceedings of the 34th SICE Annual Conference*, pp. 1605-1608, Jul. 1995.
"Invitation to Pay Additional Fees-Annex to Form PCT/ISA/206 Communication Relating to the Results of the Partial International Search", PCT/US2004/041490.
U.S. Appl. No. 09/257,896, filed Feb. 25, 1999, Eryurek et al.
"A TCP\IP Tutorial" by, Socolofsky et al., Spider Systems Limited, Jan. 1991 pp. 1-23.
"Approval Standards for Explosionproof Electrical Equipment General Requirements", Factory Mutual Research, Cl. No. 3615, Mar. 1989, pp. 1-34.
"Approval Standard Intrinsically Safe Apparatus and Associated Apparatus for Use in Class I, II, and III, Division 1 Hazardous (Classified) Locations", Factory Mutual Research, Cl. No. 3610, Oct. 1988, pp. 1-70.
"Automation On-line" by, Phillips et al., Plant Services, Jul. 1997, pp. 41-45.
"Climb to New Heights by Controlling your PLCs Over the Internet" by, Phillips et al., Intech, Aug. 1998, pp. 50-51.
"CompProcessor for Piezoresistive Sensors" MCA Technologies Inc. (MCA7707), pp. 1-8.
"Ethernet emerges as viable, inexpensive fieldbus", Paul G. Schreier, Personal Engineering, Dec. 1997, p. 23-29.
"Ethernet Rules Closed-loop System" by, Eidson et al., Intech, Jun. 1998, pp. 39-42.
"Fieldbus Standard for Use in Industrial Control Systems Part 2: Physical Layer Specification and Service Definition", ISA-S50.02-1992, pp. 1-93.
"Fieldbus Standard for Use in Industrial Control Systems Part 3: Data Link Service Definition", ISA-S50.02-1997, Part 3, Aug. 1997, pp. 1-159.
Fieldbus Standard for Use in Industrial Control Systems Part 4: Data Link Protocol Specification, ISA-S50.02-1997, Part 4, Aug. 1997, pp. 1-148.
"Fieldbus Support for Process Analysis" by, Blevins et al., Fisher-Rosemount Systems, Inc., 1995, pp. 121-128.
"Fieldbus Technical Overview Understanding Foundation™ fieldbus technology", Fisher-Rosemount, 1998, pp. 1-23.
"Hypertext Transfer Protocol—HTTP/1.0" by, Berners-Lee et al., MIT/LCS, May 1996, pp. 1-54.
"Infranets, Intranets, and the Internet" by, Pradip Madan, Echelon Corp, Sensors, Mar. 1997, pp. 46-50.
"Internet Technology Adoption into Automation" by, Fondl et al., Automation Business, pp. 1-5.
"Internet Protocol Darpa Internet Program Protocol Specification" by, Information Sciences Institute, University of Southern California, RFC 791, Sep. 1981, pp. 1-43.
"Introduction to Emit", emWare, Inc., 1997, pp. 1-22.
"Introduction to the Internet Protocols" by, Charles L. Hedrick, Computer Science Facilities Group, Rutgers University, Oct. 3, 1988, pp. 1-97.
"Is There a Future for Ethernet in Industrial Control?", Miclot et al., Plant Engineering, Oct. 1988, pp. 44-46, 48, 50.
LFM/SIMA Internet Remote Diagnostics Research Project Summary Report, Stanford University, Jan. 23, 1997, pp. 1-6.
"Managing Devices with the Web" by, Howard et al., Byte, Sep. 1997, pp. 45-64.
"Modular Microkernel Links GUI and Browser for Embedded Web Devices" by, Tom Williams, pp. 1-2.
"PC Software Gets Its Edge From Windows, Components, and the Internet", Wayne Labs, I&CS, Mar. 1997, pp. 23-32.
Proceedings Sensor Expo, Aneheim, California, Produced by Expocon Managemnet Associates, Inc., Apr. 1996, pp. 9-21.
Proceedings Sensor Expo, Boston, Massachuttes, Produced by Expocon Management Associates, Inc., May 1997, pp. 1-416.

"Smart Sensor Network of the Future" by, Jay Warrior, Sensors, Mar. 1997, pp. 40-45.
"The Embedded Web Site" by, John R. Hines, IEEE Spectrum, Sep. 1996, p. 23.
"Transmission Control Protocol: Darpa Internet Program Protocol Specification" Information Sciences Institute, Sep. 1981, pp. 1-69.
"On-Line Statistical Process Control for a Glass Tank Ingredient Scale," by R.A. Weisman, *IFAC real Time Programming*, 1985, pp. 29-38.
"The Performance of Control Charts for Monitoring Process Variation," by C. Lowry et al., *Commun. Statis.—SIMULA.*, 1995, pp. 409-437.
"A Knowledge-Based Approach for Detection and Diagnosis of Out-Of-Control Events in Manufacturing Processes," by P. Love et al., *IEEE*, 1989, pp. 736-741.
"Advanced Engine Diagnostics Using Universal Process Modeling", by P. O'Sullivan, *Presented at the 1996 SAE Conference on Future Transportation Technology*, pp. 1-9.
Parallel, Fault-Tolerant Control and Diagnostics System for Feedwater Regulation in PWRS, by E. Eryurek et al., *Proceedings of the American Power Conference*.
"Programmable Hardware Architectures for Sensor Validation", by M.P. Henry et al.; *Control Eng. Practice*, vol. 4, No. 10., pp. 1339-1354, (1996).
"Sensor Validation for Power Plants Using Adaptive Backpropagation Neural Network,"*IEEE Transactions on Nuclear Science*, vol. 37, No. 2, by E. Eryurek et al. Apr. 1990, pp. 1040-1047.
"Signal Processing, Data Handling and Communications: The Case for Measurement Validation", by M.P. Henry, *Department of Engineering Science*, Oxford University.
"Smart Temperature Measurement in the '90s", by T. Kerlin et al., *C&I*, (1990).
"Software-Based Fault-Tolerant Control Design for Improved Power Plant Operation," *IEEE/IFAC Joint Symposium on Computer-Aided Control System Design*, Mar. 7-9, 1994 pp. 585-590.
A Standard Interface for Self-Validating Sensors, by M.P. Henry et al., Report No. QUEL 1884/91, (1991).
"Taking Full Advantage of Smart Transmitter Technology Now," by G. Orrison, *Control Engineering*, vol. 42, No. 1, Jan. 1995.
"Using Artificial Neural Networks to Identify Nuclear Power Plant States," by Israel E. Alguindigue et al., pp. 1-4.
"Application of Neural Computing Paradigms for Signal Validation," by B.R. Upadhyaya et al., *Department of Nuclear Engineering*, pp. 1-18.
"Application of Neural Networks for Sensor Validation and Plant Monitoring," by B. Upadhyaya et al., *Nuclear Technology*, vol. 97, No. 2, Feb. 1992 pp. 170-176.
"Automated Generation of Nonlinear System Characterization for Sensor Failure Detection," by B.R. Upadhyaya et al., *ISA*, 1989 pp. 269-274.
"In Situ Calibration of Nuclear Plant Platinum Resistance Thermometers Using Johnson Noise Methods," *EPRI*, Jun. 1983.
"Johnson Noise Thermometer for High Radiation and High-Temperature Environments," by L. Oakes et al., *Fifth Symposium on Space Nuclear Power Systems*, Jan. 1988, pp. 2-23.
"Development of a Resistance Thermometer for Use Up to 1600° C.", by M.J. de Groot et al., *CAL Lab*, Jul./Aug. 1996, pp. 38-41.
"Survey, Applications, and Prospects of Johnson Noise Thermometry," by T. Blalock et al., *Electrical Engineering Department*, 1981 pp. 2-11.
"Noise Thermometry for Industrial and Metrological Applications at KFA Julich," by H. Brixy et al., *7th International Symposium on Temperature*, 1992.
"Johnson Noise Power Thermometer and its Application in Process Temperature Measurement," by T.V. Blalock et al., *American Institute of Physics* 1982, pp. 1249-1259.
"Field-based Architecture is Based on Open Systems, Improves Plant Performance", by P. Cleaveland, *I&CS*, Aug. 1996, pp. 73-74.
"Tuned-Circuit Dual-Mode Johnson Noise Thermometers," by R.L. Shepard et al., Apr. 1992.
"Tuned-Circuit Johnson Noise Thermometry," by Michael Roberts et al., $7^{th}$ *Symposium on Space Nuclear Power Systems*, Jan. 1990.

"Smart Field Devices Provide New Process Data, Increase System Flexibility," by Mark Boland, *I&CS*, Nov. 1994, pp. 45-51.
"Wavelet Analysis of Vibration, Part I: Theory[1]," by D.E. Newland, *Journal of Vibration and Acoustics*, vol. 116, Oct. 1994, pp. 409-416.
"Wavelet Analysis of Vibration, Part 2: Wavelet Maps," by D.E. Newland, *Journal of Vibration and Acoustics*, vol. 116, Oct. 1994, pp. 417-425.
"Development of a Long-Life, High-Reliability Remotely Operated Johnson Noise Thermometer," by R.L. Shepard et al., *ISA*, 1991, pp. 77-84.
"Application of Johnson Noise Thermometry to Space Nuclear Reactors," by M.J. Roberts et al., *Presented at the 6th Symposium on Space Nuclear Power Systems*, Jan. 9-12, 1989.
"A Decade of Progress in High Temperature Johnson Noise Thermometry," by T.V. Blalock et al., *American Institute of Physics*, 1982 pp. 1219-1223.
"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29-Aug. 1, 1996, pp. 50-1-50-6.
"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310-1314.
"Detecting Blockage in Process Connections of Differential Pressure Transmitters", by E. Taya et al., *SICE*, 1995, pp. 1605-1608.
"Development and Application of Neural Network Algorithms for Process Diagnostics," by H.R. Upadhyaya et al., *Proceedings of the 29th Conference on Decision and Control*, 1990, pp. 3277-3282.
"A Fault-Tolerant Interface for Self-Validating Sensors", by M.P. Henry, *Colloquium*, pp. 3/1-3/2 (Nov. 1990).
"Fuzzy Logic and Artificial Neural Networks for Nuclear Power Plant Applications," by R.C. Berkan et al., *Proceedings of the American Power Conference*.
"Fuzzy Logic and Neural Network Applications to Fault Diagnosis", by P. Frank et al., *International Journal of Approximate Reasoning*, (1997), pp. 68-88.
"Keynote Paper: Hardware Compilation—A New Technique for Rapid Prototyping of Digital Systems-Applied to Sensor Validation", by M.P. Henry, *Control Eng. Practice*, vol. 3, No. 7., pp. 907-924, (1995).
"The Implications of Digital Communications on Sensor Validation", by M. Henry et al., Report No. QUEL 1912/92, (1992).
"In-Situ Response Time Testing of Thermocouples", *ISA*, by H.M. Hashemian et al., Paper No. 89-0056, pp. 587-593, (1989).
"An Integrated Architecture for Signal Validation in Power Plants," by B.R. Upadhyaya et al., *Third IEEE International Symposium on Intelligent Control*, Aug. 24-26, 1988, pp. 1-6.
"Integration of Multiple Signal Validation Modules for Sensor Monitoring," by B. Upadhyaya et al., *Department of Nuclear Engineering*, Jul. 8, 1990, pp. 1-6.
"Intelligent Behaviour for Self-Validating Sensors", by M.P. Henry, *Advances in Measurement*, pp. 1-7, (May 1990).
"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284-L286.
"Check of Semiconductor Thermal Resistanc Elements by the Method of Noise Thermometry", by A. B. Kisilevskii et al., *Measurement Techniques*, vol. 25, No. 3, Mar. 1982, New York, USA, pp. 244-246.
"Neural Networks for Sensor Validation and Plant Monitoring," by B. Upadhyaya, *International Fast Reactor Safety Meeting*, Aug. 12-16, 1990, pp. 2-10.
"Neural Networks for Sensor Validation and Plantwide Monitoring," by E. Eryurek, 1992.
"A New Method of Johnson Noise Thermometry", by C.J. Borkowski et al., *Rev. Sci. Instrum.*, vol. 45, No. 2, (Feb. 1974) pp. 151-162.
"Thermocouple Continuity Checker," IBM Technical Disclosure Bulletin, vol. 20, No. 5, pp. 1954 (Oct. 1977).
"A Self-Validating Thermocouple," Janice C-Y et al., IEEE Transactions on Control Systems Technology, vol. 5, No. 2, pp. 239-253 (Mar. 1997).

*Instrument Engineers' Handbook*, Chapter IV entitled "Temperature Measurements," by T.J. Claggett, pp. 266-333 (1982).

"emWare's Releases EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1-14, Rosemount Inc. (1997).

Warrior, J., "The Collision Between the Web and Plant Floor Automation," 6th. WWW Conference Workshop on Embedded Web Technology, Santa Clara, CA (Apr. 7, 1997).

Microsoft Press Computer Dictionary, 3rd Edition, p. 124.

"Internal Statistical Quality Control for Quality Monitoring Instruments", by P. Girling et al., *ISA*, 15 pgs., 1999.

Web Pages from www.triant.com (3 pgs.).

"Statistical Process Control (Practice Guide Series Book)", *Instrument Society of America*, 1995, pp. 1-58 and 169-204.

"Time-Frequency Analysis of Transient Pressure Signals for a Mechanical Heart Valve Cavitation Study," *ASAIO Journal*, by Alex A. Yu et al., vol. 44, No. 5, pp. M475-M479, (Sep.-Oct. 1998).

"Transient Pressure Signals in Mechanical Heart Valve Caviation," by Z.J. Wu et al., pp. M555-M561.(undated).

"Caviation in Pumps, Pipes and Valves," *Process Engineering*, by Dr. Ronald Young, pp. 47 and 49 (Jan. 1990).

"Quantification of Heart Valve Cavitation Based on High Fidelity Pressure Measurements," *Advances in Bioengineering 1994*, by Laura A. Garrison et al., BED-vol. 28, pp. 297-298 (Nov. 6-11, 1994).

"Monitoring and Diagnosis of Cavitation in Pumps and Valves Using the Wigner Distribution," *Hydroaccoustic Facilities, Instrumentation, and Experimental Techniques*, NCA-vol. 10, pp. 31-36 (1991).

"Developing Predictive Models for Cavitation Erosion," *Codes and Standards in a Global Environment*, PVP-vol. 259, pp. 189-192 (1993).

"Self-Diagnosing Intelligent Motors: A Key Enabler for Next Generation Manufacturing System," by Fred M. Discenzo et al., pp. 3/1-3/4 (1999).

"A Microcomputer-Based Instrument for Applications in Platinum Resistance Thermomety," by H. Rosemary Taylor and Hector A. Navarro, Journal of Physics E. Scientific Instrument, vol. 16, No. 11, pp. 1100-1104 (1983).

"Experience in Using Estelle for the Specification and Verification of a Fieldbus Protocol: FIP," by Barretto et al., Computer Networking, pp. 295-304 (1990).

"Computer Simulation of H1 Field Bus Transmission," by Utsumi et al., Advances in Instrumentation and Control, vol. 46, Part 2, pp. 1815-1827 (1991).

"Progress in Fieldbus Developments for Measuring and Control Application," by A. Schwaier, Sensor and Acuators, pp. 115-119 (1991).

"Ein Emulationssystem zur Leistungsanalyse von Feldbussystemen, Teil 1," by R. Hoyer, pp. 335-336 (1991).

"Simulatore Integrato: Controllo su bus di campo," by Barabino et al., Automazione e Strumentazione, pp. 85-91 (Oct. 1993).

"Ein Modulares, verteiltes Diagnose-Expertensystem für die Fehlerdiagnose in lokalen Netzen," by Jürgen M. Schroder, pp. 557-565 (1990).

"Fault Diagnosis of Fieldbus Systems," by Jürgen Quade, pp. 577-581 (Oct. 1992).

"Ziele und Anwendungen von Feldbussystemen," by T. Pfeifer et al., pp. 549-557 (Oct. 1987).

"PROFIBUS Infrastructure Measures," by Tilo Pfeifer et al., pp. 416-419 (Aug. 1991).

"Simulation the Time Behaviour of Fieldbus Systems," by O. Schnelle, pp. 440-442 (1991).

"Modélisation et simulation d'un bus de terrain: FIP," by Song et al, pp. 5-9 (undated).

"Field Bus Networks for Automation Systems Containing Intelligent Functional Unites," by W. Kriesel et al., pp. 486-489 (1987).

"Field Buses for Process Interconnection with Digital Control Systems," Tecnología, pp. 141-147 (1990).

"Decentralised Systems with Real-Time Field Bus," Netzwerke, Jg. Nr.3 v. 14.3, 4 pages (1990).

"Process Measurement and Analysis," by Liptak et al., Instrument Engineers' Handbook, Third Edition, pp. 528-530, (1995).

"Improving Dynamic Performance of Temperature Sensors With Fuzzy Control Techniques," by Wang Lei et al., pp. 872-873 (1992).

"Microsoft Press Computer Dictionary" 2nd Edition, 1994, Microsoft Press. p. 156.

International Search Report from Application No. PCT/US01/40791 with international filing date of May 22, 2001.

International Search Report from Application No. PCT/US01/40782 with international filing date of May 22, 2001.

International Search Report from Application No. PCT/02/14560 with international filing date of May 8, 2002.

International Search Report from Application No. PCT/US02/14934 with international filing date of May 8, 2002.

"On-Line Tool Condition Monitoring System With Wavelet Fuzzy Neural Network," by Li Xiaoli et al., pp. 271-276 (1997).

"Optimal Design of the Coils of an Electromagnetic Flow Meter," by Michalski, A. et al., IEEE Transactions on Magnetics, vol. 34, Issue 5, Part 1, pp. 2563-2566 (1998).

"Magnetic Fluid Flow Meter for Gases," Popa, N.C., IEEE Transactions on Magnetics, vol. 30, Issue 2, Part 1-2, pp. 936-938 (1993).

"New Approach to a Main Error Estimation for Primary Transducer of Electromagnetic Flow Meter," by Michalski, A., IEEE Instrumentation and Measurement Technology Conference Proceedings, vol. 2, pp. 1093-1097 (1998).

"Additional Information From Flowmeters via Signal Analysis," by Amadi-Echendu, J.E. et al., IEEE Instrumentation and Measurement Technology Conference Record, vol. 7, pp. 187-193 (1990).

International Search Report from Application No. PCT/US02/06606 with international filing date of Mar. 5, 2002.

International Search Report from Application No. PCT/US02/30465 with international filing date of Sep. 25, 2002.

"What is a weighted moving average?", *DAU Stat Refresher*, http://cne.gmu.edu/modules/dau/stat/mvavgs/wma_bdy.html, (1995).

U.S. Appl. No. 10/675,014, filed Sep. 2003, Longsdorf et al.

U.S. Appl. No. 10/744,809, filed Dec. 2003, Brown et al.

"Statistics Glossary: Time Series Data", by Easton et al., http://www.stats.gla.ac.uk/steps/glossary/time_series.html, Sep. 1997.

U.S. Appl. No. 10/893,144, filed Jul. 2004, Brown et al.

"Notification of Transmittal of International Search Report and the Written Opinion", PCT/US2006/037535.

"International Search Report" for related Application No. PCT/US2007/017301.

"Written Opinion" for related Application No. PCT/US2007/017301.

Communication from EPO for Application 02725990.2-2209 filed Jun. 23, 2008; 5 pages.

Technical Information: HART Communication, Samson; Dec. 1999; 40 pages.

First Office Action for related Chinese patent application No. 200780030039.6 issued Apr. 13, 2010.

Eryurek et al., "Advanced Diagnostics Achieved with Intelligent Sensors and Fieldbus", 2001, Measurement + Control vol. 34, Dec. 2001, 7 pages.

Office Action from Chinese Application No. 200780030039.6, dated Dec. 1, 2010.

Office Action from European Application No. 07836452.8, dated Jun. 6, 2011.

Communication from European Application No. 07838659.6, dated Jun. 24, 2010.

"Notification of Transmittal of International Search Report and the Written Opinion", PCT/US2004/022736.

"Notification of Transmittal of the International Search Report", PCT/US00/14798.

"Notification of Transmittal of International Search Report and the Written Opinion", PCT/US2007/012317.

Samson, Technical Information; HART Communication, Part 4 Communications; 40 pp.

"A Supervision Support System for Industrial Processes" by J. Penalva et al., IEEE, Oct. 1993, pp. 57-65.

International Search Report and Written Opinion for Application No. PCT/US2005/020010, filed Jun. 7, 2005.

Official Action from related Application No. RU 2001-19037/06, filed Jul. 2000.
Office Action from corresponding Japanese Application No. 2009/524611, dated Jul. 26, 2011, 7 pgs.
"Field Device Complications", by J. Rezabek, *InTech*, Apr. 2006, HighBeam Research online database, www.highbeam.com, 2 pgs.
First Office Action from Chinese Application No. 200780035735.6, dated Mar. 15, 2011, 4 pgs.
Office Action from Japanese Application No. 2010-519967, dated Feb. 7, 2012, 11 pages.
The English translation of the Chinese Office Action for corresponding Chinese Application No. 200780030039.6, dated Nov. 25, 2011, 8 pages.3.
Japanese Office Action JP 2000-601401, dated Sep. 7, 2011.
Reeves-T., "Optimizing Process Equipment Performance", 2005, Emerson Process Management, 5 pages.
PlantWeb, "Improving Availability" Emerson White Paper, 2003, 15 pages.
PlantWeb, "Reducing Operations & Maintenance Costs", 2003, 18 pages.
"Invitation to Pay Additional Fees" for PCT/US2004/031678.
"Notification of Transmittal of the International Search Report or the Declaration", PCT/US2004/025291.
"Notification of Transmittal of the International Search Report or the Declaration", PCT/US2004/031678.
"Notification of Transmittal of the International Search Report or the Declaration", PCT/US2005/011385.
"Notification of Transmittal of the International Preliminary Report on Patenatability", PCT/US2004/031678.
Official Action from Application No. RU 2001-19037/06.
Second Office Action for Japanese Application No. 2009-524611, dated May 7, 2012, 4 pages.
"What is a weighted moving average?", DAU Stat Refresher, http://cne.gmu.edu/modules/dau/stat/myaygs/wma_bdy.html. (1995).
"Statistics Glossary: Time Series Data", by Easton et al., http://www.stats.gla.ac.uk/steps/glossay/time_series.html, Sep. 1997.
"The Indicators Story", Sustainable Seattle, pp. 55-59, 1998.
"Detecting Regimes in Temperature Time Series", by Clemins et al., *Artificial Neural Networks in Engineering, Proceedings*, pp. 727-732, 2001.
"Re: Digital Filter-Moving Average", The Math Forumn, http://mathforum.org/discuss/sci.math/a/t/177212, Sep. 28, 1998.
"Notification of Transmittal of the International Search Report and the Written Opinion of the International Searching Authority", or the Declaration for PCT/US2004/017300.

* cited by examiner

FLOW MEASUREMENT DIAGNOSTICS

The present invention is a Continuation-In-Part of and claims priority to U.S. application Ser. No. 10/801,073, filed Mar. 15, 2004, now U.S. Pat. No. 7,254,518 which is a Continuation-In-Part of U.S. application Ser. No. 09/852,102, May, 9, 2001 now U.S. Pat. No. 6,907,383, which is a Continuation-In-Part of U.S. application Ser. No. 09/257,896, filed Feb. 25, 1999, abandoned which is a Continuation-In-Part of U.S. application Ser. No. 08/623,569, Mar. 28, 1996 now U.S. Pat. No. 6,017,143, application Ser. No. 09/852,102 is also a Continuation-In-Part of U.S. application Ser. No. 09/383,828, Aug. 27, 1999 now U.S. Pat. No. 6,654,697, which is a Continuation-In-Part of U.S. application Ser. No. 09/257,896, filed Feb. 25, 1999 now abandoned which is a Continuation-In-Part of U.S. application Ser. No. 08/623,569, filed Mar. 28, 1996, now U.S. Pat. No. 6,017,143.

BACKGROUND OF THE INVENTION

The present invention relates to fluid process control and monitoring systems. In particular, the present invention relates to diagnostics for such systems.

Fluid flow meters are used in industrial process control and monitoring environments to measure fluid flow and provide flow signals for flow indicators and controllers. Inferential flow meters measure fluid flow in a pipe by measuring a pressure drop near a discontinuity within the pipe. The discontinuity (primary element) can be an orifice, a nozzle, a venturi, a pitot tube, a vortex shedding bar, a target or even a simple bend in the pipe. Flow around the discontinuity causes both a pressure drop and increased turbulence. The pressure drop is sensed by a pressure transmitter (secondary element) placed outside the pipe and connected by impulse lines or impulse passageways to the fluid in the pipe. Reliability depends on maintaining a correct calibration. Erosion or buildup of solids on the primary element can change the calibration. Impulse lines can become plugged over time which isolates the pressure transmitter from the process such that the transmitter is no longer able to track the pressure and adversely affects the operation of the transmitter.

Disassembly and inspection of the impulse lines is one method used to detect and correct plugging of lines. Another known method for detecting plugging is to periodically add a "check pulse" to the measurement signal from a pressure transmitter. This check pulse causes a control system connected to the transmitter to disturb the flow. If the pressure transmitter fails to accurately sense the flow disturbance, an alarm signal is generated indicating line plugging. Another known method for detecting plugging is sensing of both static and differential pressures. If there is inadequate correlation between oscillations in the static and differential pressures, then an alarm signal is generated indicating line plugging. Still another known method for detecting line plugging is to sense static pressures and pass them through high pass and low pass filters. Noise signals obtained from the filters are compared to a threshold, and if variance in the noise is less than the threshold, then an alarm signal indicates that the line is blocked.

SUMMARY

A flow meter for measuring flow of a process fluid includes a sensor configured to provide a sensor output signal related to flow of the process fluid. Circuitry is configured to determine a statistical parameter related to sensor output signal. A diagnostic output is provided based upon the determined statistical parameter and the sensor output signal.

DETAILED DESCRIPTION

Figure 1:
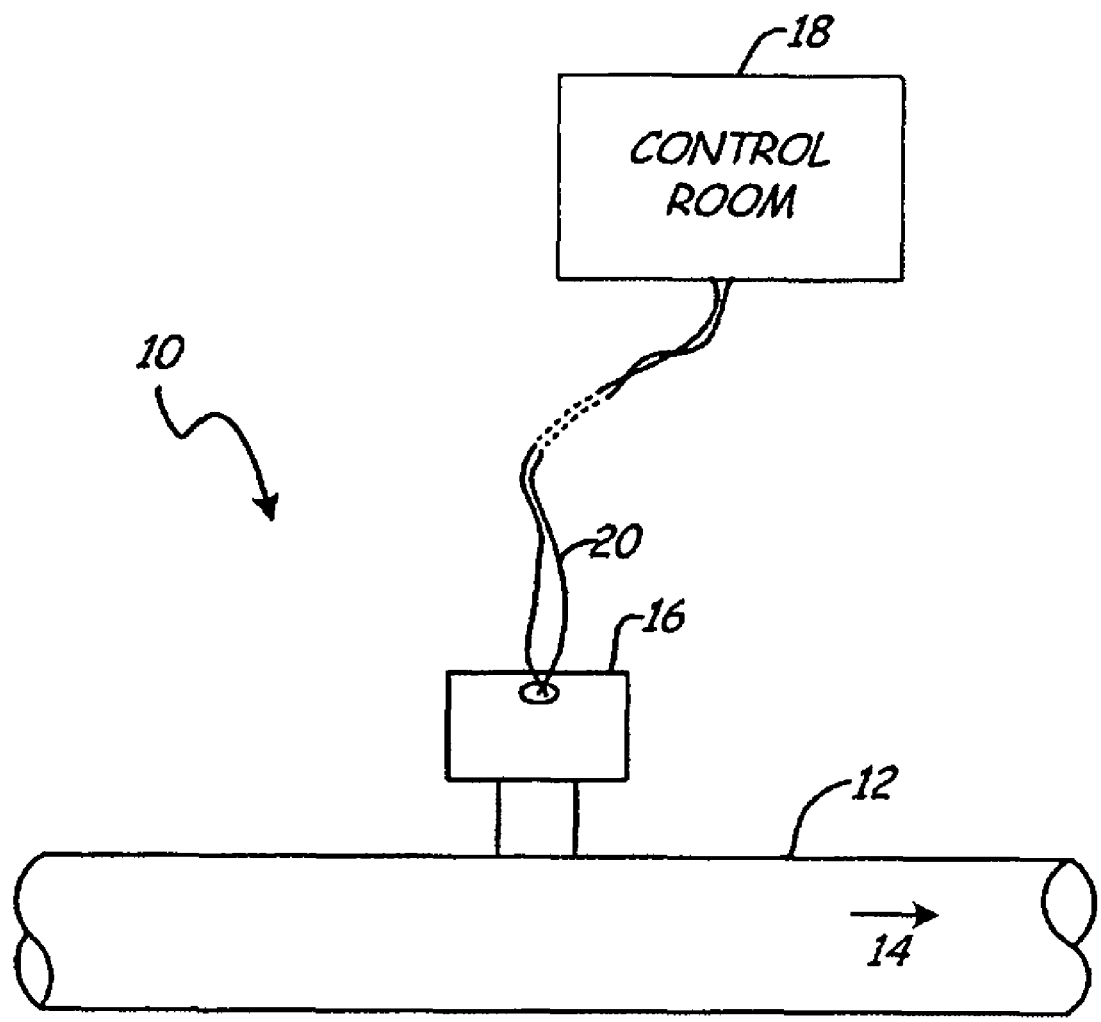
FIG. 1 is a simplified diagram of a process control or monitoring system.

FIG. 1 is a simplified diagram of a process control or monitoring system 10 in which process piping 12 carries a flow 14 of process fluid. A flow transmitter 16 is configured to sense the flow 14 and provide an output related to the flow 14. In the example shown in FIG. 1, the output is provided to control room 18 over a two wire process control loop 20. Loop 20 can operate in accordance with any protocol. Example standard protocols includes 4-20 mA signals, the HART® communication protocol or Fieldbus protocols. However, the present invention is not limited to such communication techniques, including wireless techniques, and can even operate in a stand alone device.

Process variable transmitter 16 senses flow using any appropriate technique. Example techniques include measuring a differential pressure across a restriction in the pipe 12, magnetic based technologies, pitot tubes, vibrating sensors, etc.

In accordance with the invention, transmitter 16 provides a diagnostic output based upon the flow 14 and noise in a sensor output signal. In one specific configuration, a correlation between standard deviation of the sensor signal and the sensor signal is used for diagnostics. The diagnostic output can be used internally to transmitter 16, or can be provided externally, for example by transmission over loop 20.

Figure 2:
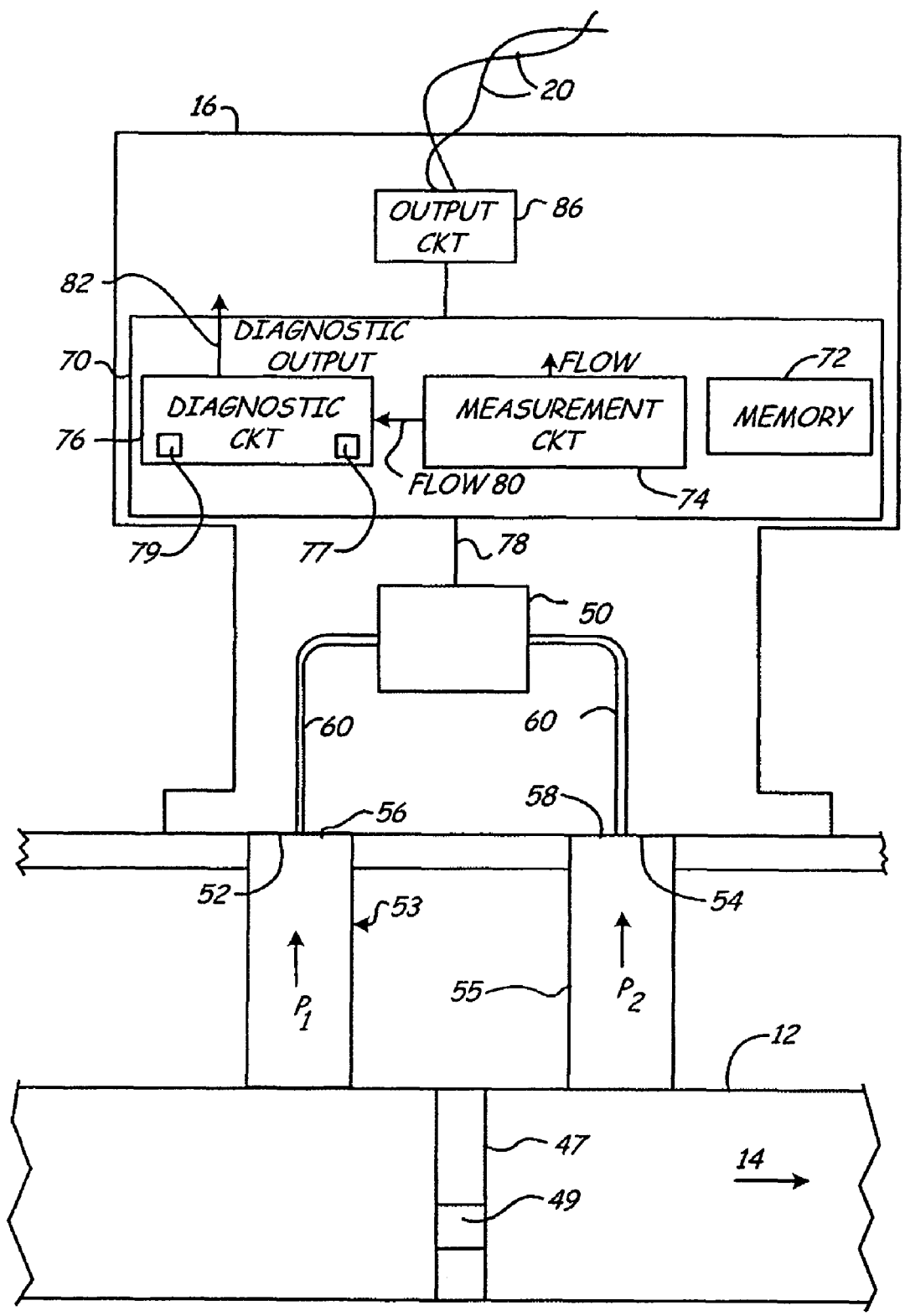
FIG. 2 is a simplified block diagram showing a cross-sectional view of the transmitter shown in FIG. 1.

FIG. 2 is a simplified block diagram of transmitter 16 shown in FIG. 1. In the diagram of FIG. 2, transmitter 16 is illustrated as including a differential pressure sensor. In such a configuration, a difference in pressures P1 and P2 is applied to the transmitter 16 and can be used to infer the rate of flow 14 through process piping 12 shown in FIG. 1. An orifice plate 47 is placed in the process piping and includes an orifice 49 formed therein. The orifice plate 47 creates a differential pressure which is the difference between pressures P1 and P2 as the flow 14 is forced to flow through the restricted orifice 49. The invention is not limited to such a flow measurement technique.

Pressures P1 and P2 are applied to isolation diaphragms 52 and 54 through process coupling 53 and 55, respectively. The isolation diaphragms 52 and 54 form respective cavities 56 and 58 in the transmitter 16. The cavities 56 and 58 are isolated from the process fluid and contain an isolation fluid. Small capillary tubes 60 and 62 lead from respective cavities 56 and 58 to differential pressure sensor 50. The capillary tubes 60 and 62 transfer the pressure from pressure applied by P1 and P2 to the differential pressure sensor 50 while isolating the pressure sensor 50 from the process fluid.

Differential pressure sensor 50 can operate in accordance with any technology. One example technology uses a deflectable diaphragm which forms a variable capacitance. The pressure sensor 50 couples to transmitter circuit 70 and provides a sensor output to transmitter circuit 70. Transmitter circuit 70 can comprise any type of circuit configuration. Typically, a transmitter circuit 70 includes a microprocessor or other digital controller along with a memory 72. The memory 72 stores program instructions, configuration information, temporary variables and the like. Transmitter circuit 70 includes measurement circuit 74 which provides an output related to flow of the process fluid. The flow can be determined using any appropriate technique. Diagnostic circuit 76 is also implemented in transmitter circuit 70. The diagnostic circuit 76 includes circuitry 77 to determine a statistical parameter related to the sensor output signal 78. The statistical parameter can be indicative of noise in the sensor output signal 78 and, in one specific embodiment, the statistical parameter comprises standard deviation. Output circuitry 86 receives the flow signal and provides an output on two wire process control loop 20 in accordance with a desired signal and protocol.

In the configuration shown in FIG. 2, the diagnostic circuit 76 receives the flow signal from measurement circuit 74 along with the sensor output 78 from sensor 50. As used herein, the flow signal and sensor signal can be processed prior to receipt by diagnostic circuit 76. Based upon the flow signal 80 and the sensor output 78, diagnostic circuit 76 provides a diagnostic output 82. The diagnostic output 82 can be used locally by transmitter 16 and can be provided externally, for example by transmission over two wire process control loop 20.

The diagnostic output is indicative of a condition of one or more components of transmitter 16, or other components coupled to the industrial process 10 shown in FIG. 1. For example, the diagnostic output 82 can provide an indication that one of the process couplings 53, 55 is becoming plugged. This information can be used alone, or in combination with other line plugging diagnostics to identify the plugging of process couplings 53, 55. Another example diagnostic is indicative of wear in the restrictive orifice plate used to create the differential pressure. This wear can cause edge corrosion in the plate resulting in inaccurate flow measurements. Similarly, loss of the isolation fill fluid carried in capillaries 60, 62 and cavities 56, 58 can be detected. The diagnostic output 82 can also be indicative of the composition of the process fluid flowing through pipe 12 shown in FIG. 1. Change can be due to different fluids, changes in the components, such as contaminants in the fluid such as due to aeration or the addition of solids, etc.

Figure 3:
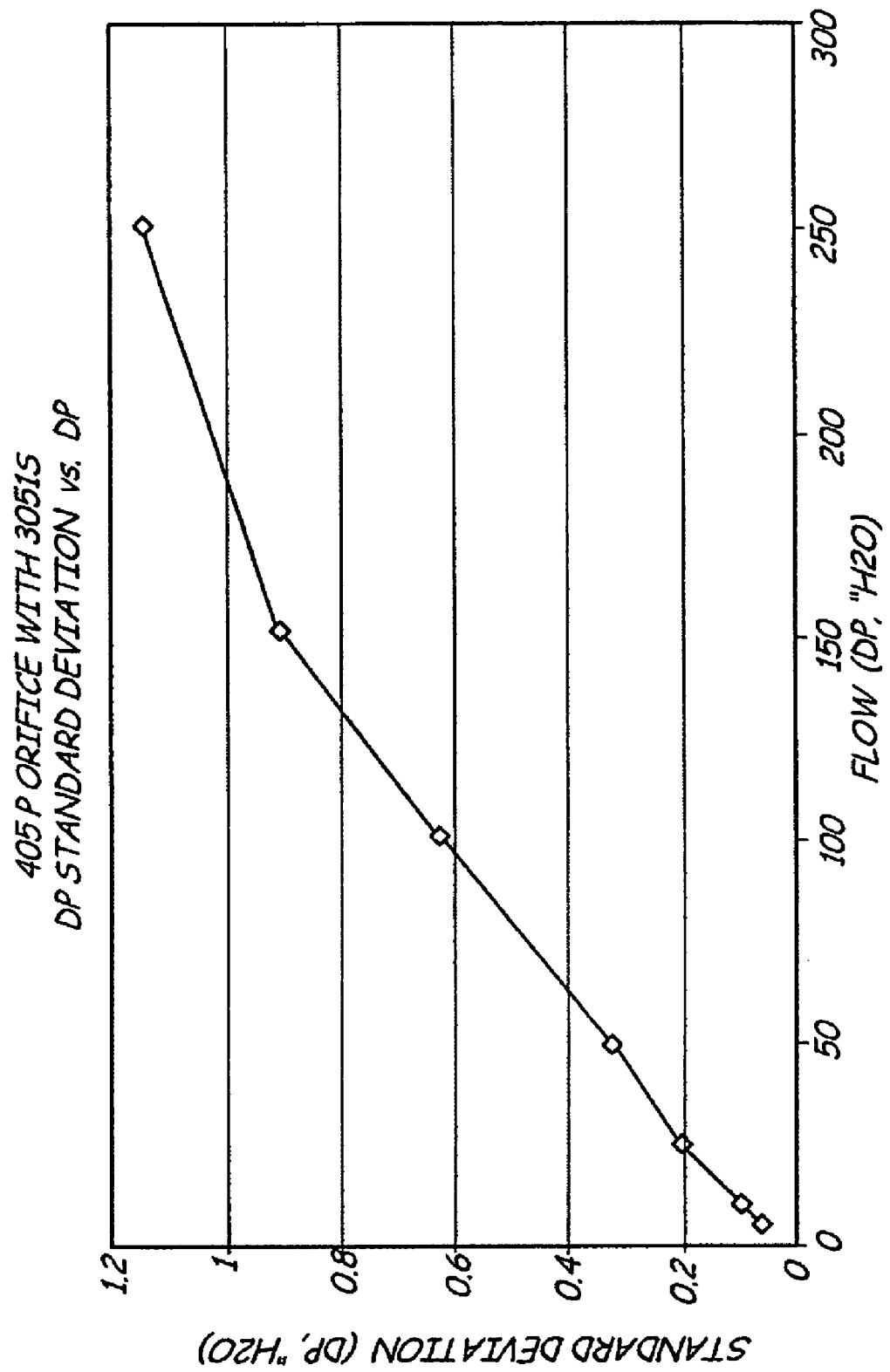
FIG. 3 is a graph of standard deviation of a differential pressure signal versus a differential pressure signal.

The particular algorithm used to correlate the sensor signal and the flow signal with the diagnostic output can be chosen as appropriate. In one example embodiment, the diagnostic circuitry 76 identifies noise in the sensor output signal and provides the diagnostic output based upon this noise and the measured flow rate. In particular, a relationship between the noise level in the sensor signal and the flow rate during steady state flow conditions is used to provide the diagnostic output 82. The standard deviation is indicative of the noise in the sensor output signal. FIG. 3 is a graph of the standard deviation of a differential pressure sensor output versus flow. In this example, the process fluid comprises water at approximately room temperature.

Figure 4:
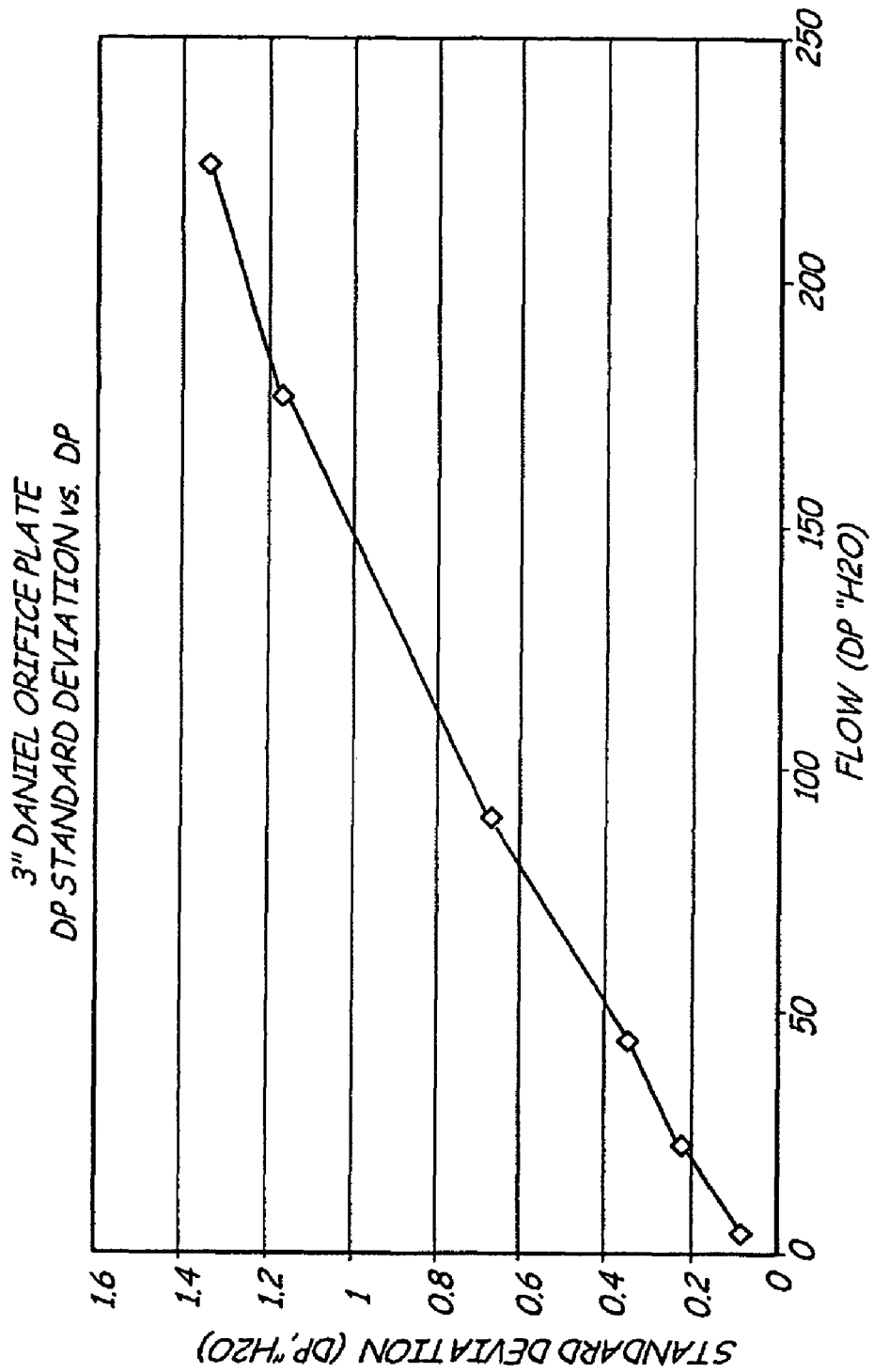
FIG. 4 is a graph of standard deviation of a differential pressure signal versus a differential pressure signal.

FIG. 4 is a similar graph using a different size orifice plate to create the differential pressure. In the case of both FIG. 3 and FIG. 4, there is an approximately linear relationship between the standard deviation of the differential pressure signal and the differential pressure signal itself. For example, as the differential pressure increases by 20% due to a change in flow rate, the standard deviation also increases by approximately 20%. Note that there is some variation in the relationship between standard deviation and differential pressure over the range of flow rates, particularly at low flow rates as the baseline noise becomes a more significant part of the total noise. However, typically the increase or decrease of this standard deviation is less than the increase or decrease in the mean differential pressure value. In some applications, the relationship between standard deviation and the sensor signal can be characterized by a more complex relationship, such as a polynomial with additional terms.

The particular relationship between standard deviation of the sensor signal and the sensor signal itself can be determined for the particular flow measurement technology. Once the relationship is determined for nominal operating conditions, the relationship can be monitored to identify a particular diagnostic condition.

In one particular embodiment, the signal 80 provided to the diagnostic circuitry 76 is the sensor output signal 78, or is directly related to the sensor output signal 78. The noise determination can be made using any technique and is not limited to the standard deviation discussed above. However, in one specific embodiment, the noise is determined based upon the standard deviation. In another example specific embodiment, the noise signal is compared to the mean of the process variable. Such a configuration is advantageous because the calculations are relatively simple. Typically, the noise of interest is in the range of from approximately 1 Hz to approximately 30 Hz. Noise signals lower than this can be difficult to identify due to slow changes in the process. In a further example technique, the diagnostic circuitry 76 includes a high pass filter 79 to filter the process variable prior to calculation of the standard deviation. Any appropriate technique can be used to determine noise in the sensor signal. Examples include a digital band pass filter that provides an RMS value of the noise that can then be related to the mean sensor signal. Another example technique to determine noise includes using a Fast Fourier Transform (FFT), wavelets, etc.

During operation, a nominal relationship between the noise signal and the sensor output signal can be stored in memory. This relationship can be determined empirically by observing operation of the transmitter 16 during normal conditions, or can be determined during manufacture and stored in memory 72. Once the transmitter 16 is placed into normal operation, the diagnostic circuitry 76 calculates the noise in the sensor signal and uses this information along with the sensor output signal and performs a comparison with the relationship stored in memory 72. The relationship stored in memory 72 can be, for example, a polynomial equation, a table of data points, etc. This information can also be updated over process control loop 20 or through other programming techniques.

Based upon the diagnostic output 82, the diagnostic information can be transmitted over process control loop 20. In another example, the diagnostic output is used to provide a local alarm, correct measurements in the process variable output from transmitter 16, used to schedule maintenance, etc. The diagnostic output can also be used in conjunction with other diagnostic techniques to provide more accurate diagnostic information.

Although the present invention has been described with reference to preferred embodiments, workers skilled in the art will recognize that changes may be made in form and detail without departing from the spirit and scope of the invention. Any type of flow measurement technology can be used in conjunction with transmitter 16 including magnetic flow meters, vortex or corioles based meters, etc. For example, sensor 50 can comprise a magnetic sensor for a magnetic flow meter, a vibration based sensor, etc.

What is claimed is:

1. A flow meter for measuring flow of a process fluid, comprising:
a sensor configured to provide a sensor output related to flow of the process fluid;
measurement circuitry configured to determine flow rate of the process fluid based upon the sensor output; and
diagnostic circuitry configured to receive the sensor output, and determine standard deviation of the sensor output from the sensor and identify a diagnostic condition by performing diagnostics by comparing a nominal relationship to a current relationship, wherein the diagnostic circuitry determines standard deviation during substantially steady state flow conditions,
the nominal relationship comprising:
a relationship between the flow rate of the process fluid and the standard deviation of the sensor output from the sensor during normal operation, and
the current relationship comprising:
a relationship between a current flow rate of the process fluid and a current standard deviation of the sensor output from the sensor.

2. The apparatus of claim 1 wherein the sensor comprises a differential pressure sensor.

3. The apparatus of claim 1 wherein the sensor comprises a magnetic sensor of a magnetic flowmeter.

4. The apparatus of claim 1 wherein the sensor comprises a vibration sensor of a vortex or corioles flowmeter.

5. The apparatus of claim 1 including a memory configured to store the nominal relationship.

6. The apparatus of claim 1 including output circuit that transmits the sensor output over a process control loop.

7. The apparatus of claim 1 wherein the diagnostic condition is related to a condition of an orifice plate.

8. The apparatus of claim 1 wherein the diagnostic condition is related to a composition of the process fluid.

9. The apparatus of claim 1 wherein the diagnostic circuitry includes a band pass filter.

10. The apparatus of claim 1 wherein the diagnostic circuitry includes a high pass filter.

11. The apparatus of claim 1 wherein the nominal relationship is determined during manufacture of the flow meter.

12. The apparatus of claim 1 wherein the nominal relationship is determined during operation of the flow meter.

13. A method of diagnosing operation of a flow meter of the type used to measure flow of process fluid, the method comprising:
coupling a sensor to a process fluid flowing through a conduit;
measuring flow of the process fluid using the sensor;
determining using a diagnostic circuitry, standard deviation of an output from the sensor during substantially steady state flow conditions; and
performing diagnostics by comparing a current relationship with a nominal relationship and responsively providing a diagnostic, output wherein:
the current relationship comprises:
a relationship between current standard deviation of the sensor output and current flow rate, and
the nominal relationship comprises:
a previously determined relationship between standard deviation of the sensor output and flow rate during normal operation.

14. The method of claim 13 wherein the sensor comprises a differential pressure sensor.

15. The method of claim 13 wherein the diagnostic output is indicative of plugging of a conduit which couples the sensor to the process fluid.

16. The method of claim 13 wherein the diagnostic output is indicative of a condition of a restrictive element in the conduit.

* * * * *